US012758869B2

(12) United States Patent
Krishnan et al.

(10) Patent No.: US 12,758,869 B2
(45) Date of Patent: Oct. 13, 2026

(54) REDUCING LATENCY IN NETWORKED GAMING BY REDUCING I-FRAME SIZES

(71) Applicant: Sony Interactive Entertainment Inc., Tokyo (JP)

(72) Inventors: Rathish Krishnan, San Mateo, CA (US); Eric Hsuming Chen, San Mateo, CA (US); Jason Wang, San Mateo, CA (US); Deepali Arya, San Mateo, CA (US); Hung-Ju Lee, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 277 days.

(21) Appl. No.: 18/478,174

(22) Filed: Sep. 29, 2023

(65) Prior Publication Data

US 2025/0108291 A1 Apr. 3, 2025

(51) Int. Cl.
*A63F 13/335* (2014.01)

(52) U.S. Cl.
CPC ...... *A63F 13/335* (2014.09); *A63F 2300/534* (2013.01)

(58) Field of Classification Search
CPC ......................... A63F 13/335; A63F 2300/534
See application file for complete search history.

(56) References Cited

U.S. PATENT DOCUMENTS

| | | | | |
|---|---|---|---|---|
| 11,336,926 | B2 * | 5/2022 | Perlman | H04L 65/75 |
| 12,108,029 | B2 * | 10/2024 | Srikantam | H04N 19/146 |
| 2005/0225680 | A1 | 10/2005 | Wahlroos | |
| 2012/0106328 | A1 * | 5/2012 | Gan | H04L 47/263 375/E7.02 |
| 2017/0279729 | A1 * | 9/2017 | Yang | H04N 21/6375 |
| 2018/0192061 | A1 | 7/2018 | He et al. | |
| 2019/0050968 | A1 | 2/2019 | Suzuki et al. | |
| 2019/0364302 | A1 | 11/2019 | Perlman et al. | |
| 2021/0266571 | A1 | 8/2021 | Chen et al. | |
| 2023/0136977 | A1 * | 5/2023 | Miura | A63F 13/35 463/31 |
| 2025/0080755 | A1 * | 3/2025 | Sabeh | H04N 19/159 |

OTHER PUBLICATIONS

International Application No. PCT/US2024/045964, International Search Report and Written Opinion, Mailed on Apr. 4, 2025, 15 pages.

* cited by examiner

*Primary Examiner* — Ronald Laneau
(74) *Attorney, Agent, or Firm* — Kilpatrick Townsend & Stockton LLP

(57) ABSTRACT

Techniques are described for reducing latency in networked gaming by reducing I-frame sizes (which also results in automatically increasing P-frame sizes) to reduce the overall amount of video being transmitted. The reduced size of the I-frames is compensated for by increasing the size of other frames using a low pass filter (LPF) such as a Gaussian filter which reduces sharpness that the decoder can try to recover, or by use of lower resolution. The I-frame can be reduced by rotating it or flipping/mirroring it to produce the smaller coded frame, sending a flag to signal the orientation.

20 Claims, 10 Drawing Sheets

1800 1802

| Reduction Filter Type | Reconstruction Filter Type |
|---|---|
| LPF | Sharpness Filter 1 |
| Circular Filter | Sharpness Filter 2 |
| Averaging | Averaging Expansion |

REDUCING LATENCY IN NETWORKED GAMING BY REDUCING I-FRAME SIZES

FIELD

The present application relates to technically inventive, non-routine solutions that are necessarily rooted in computer technology and that produce concrete technical improvements, and more specifically to reducing latency in networked gaming by reducing I-frame sizes.

BACKGROUND

Video such as computer simulation video such as computer game video may be streamed to end user terminals over a network.

SUMMARY

As understood herein, network conditions and/or regulatory-imposed network regulations regarding bandwidth limitations for energy saving may limit the network channel available to send a video such as a computer game video. As further understood herein, particularly in the case of computer gamers, latency is a principal concern under such conditions, because gamers prefer near-instantaneous reaction to their inputs, for example when shooting game weapons. Video quality may thus be less of a concern than delivering video with little to no latency.

In a first aspect, an apparatus includes at least one processor assembly configured to identify at least one condition of at least one network. The processor assembly is configured to, responsive to the condition, reduce a size of at least one I-frame of video and optionally increase a size of at least one non-I-frame of the video, and then send the I-frame and non-I-frame to a transmitter for transmission over the network.

The video can include computer game video.

In examples, the condition can include latency and/or bandwidth.

In some embodiments the processor assembly may be configured to reduce the size of the I-frame at least in part by processing the I-frame through a filter. In addition or alternatively, the processor assembly can be configured to reduce the size of the I-frame at least in part by reducing a resolution of the I-frame. Yet again, in addition or alternatively the processor assembly can be configured to reduce the size of the I-frame at least in part by changing an orientation of the I-frame and if desired signal the orientation of the I-frame.

In non-limiting implementations the I-frame can be a first I-frame and the processor assembly can be configured to reduce the size of the first I-frame responsive to the network condition and responsive to the first I-frame being of first importance, and not reduce a size of a second I-frame responsive to the network condition and responsive to the second I-frame being of second importance.

In another aspect, an apparatus includes at least one computer medium that is not a transitory signal and that in turn includes instructions executable by at least one processor assembly to reduce a first portion of video prior to encoding using at least a first filtering parameter. The instructions are executable to reduce a second portion of the video prior to encoding using at least a second filtering parameter that is not used to reduce the first portion, and transmit the portions over a network to at least one receiver.

In this aspect, in examples the instructions can be executable to transmit the portions over the network along with signaling indicating the first and second filtering parameters. The first and second portions of the video can be keyframes of the video such as I-frames or instantaneous decode refresh (IDR) frames. Or, the first and second portions can be portions of one keyframe of the video.

In example embodiments the first and second filtering parameters can include respective first and second filtering types, and/or respective first and second filtering strengths.

In another aspect, a method includes receiving, over a network, at least a portion of at least a first keyframe of at least one video. The method also includes receiving, over the network, signaling indicating reconstruction to apply to the portion of the keyframe. The method includes reconstructing the portion of the keyframe based on the signaling prior to presenting the portion of the keyframe on a video display.

In some examples, reconstructing includes up-scaling the portion of the keyframe, and/or processing the portion of the keyframe using at least one sharpening filter, and/or reorienting the portion of the keyframe.

The details of the present disclosure, both as to its structure and operation, can be best understood in reference to the accompanying drawings, in which like reference numerals refer to like parts, and in which:

DETAILED DESCRIPTION

Figure 1:
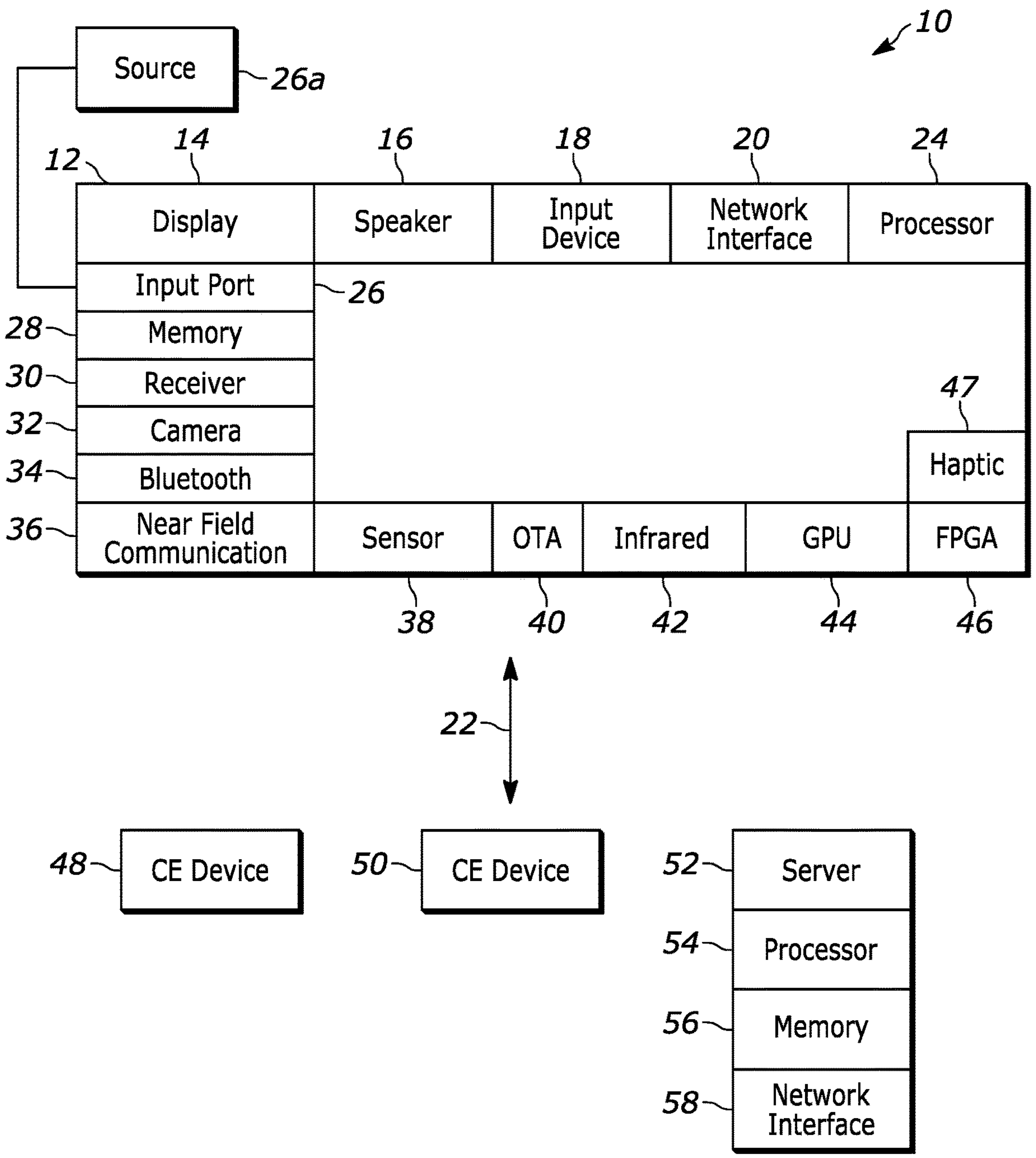
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
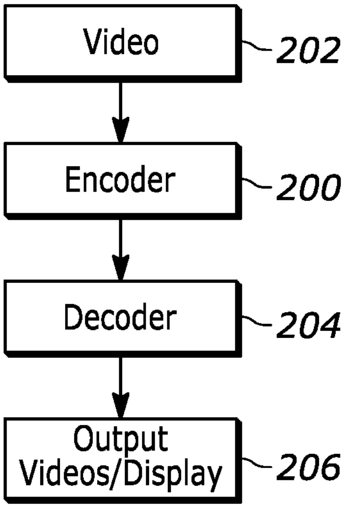
FIG. 2 illustrates an example encoder-decoder system.

FIG. 2 illustrates a system that includes a video encoder 200 for encoding/compressing videos 202. A video decoder 204 can receive the encoded videos and decode/decompress them into output videos 206.

As used herein, "keyframe" includes video frames that do not reference other video frames, including Intraframes (I-frames) and a type of I-frame known as instantaneous decode refresh (IDR) frames.

Figure 3:
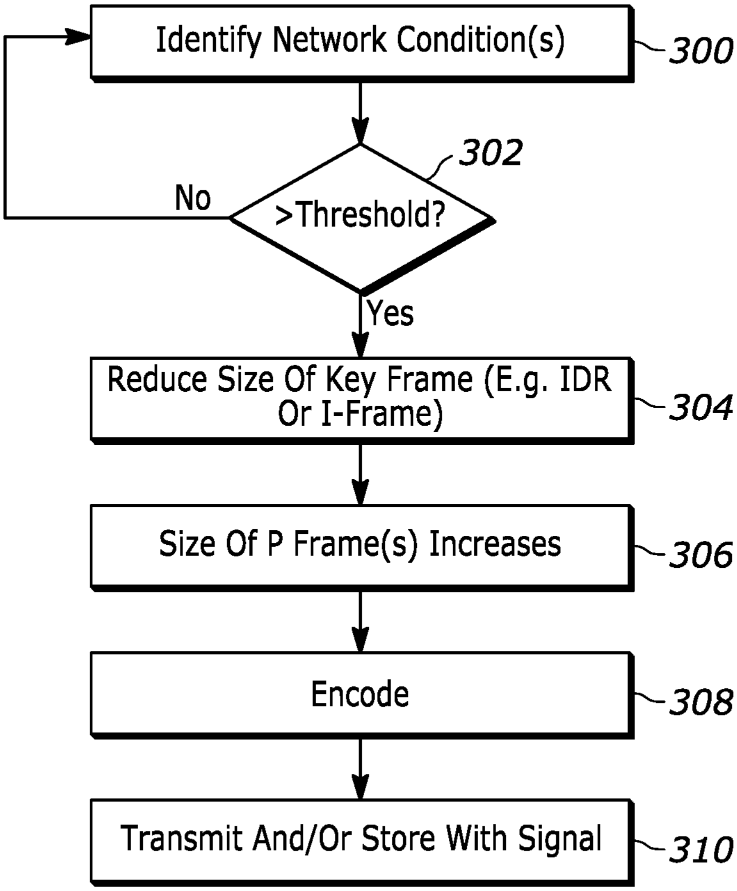
FIG. 3 illustrates example encoding logic in example flow chart format.

FIG. 3 illustrates example encoding logic. Commencing at state 300, if desired one or more conditions of a computer network over which a video such as a computer game video is to be streamed from a transmitter to a receiver are identified. For example, the bandwidth and/or latency and/or packet loss of a network path over which the video is to be streamed may be identified. If the condition is identified as meeting a throttling threshold at state 302, the size of at least one keyframe of the video, such as an I-frame such as an IDR, can be reduced at state 304. For example, if bandwidth is determined to be below a threshold, the size of the keyframe may be reduced. Or, if network latency is above a latency threshold, keyframe size may be reduced. The identification of the network condition may occur in real time or may be predetermined or preset and the transmitter signaled to reduce keyframe size.

State 306 indicates that responsive to the keyframe size being reduced owing to limiting network condition(s), the size of a predictive frame (P-frame) may be increased. This may occur automatically by the P-frame generation algorithm or engine in response to the keyframe size being reduced. The diminished keyframe and enlarged P-frame are encoded at state 308 for transmission to a receiver over the network and/or storage at state 310.

Figure 4:
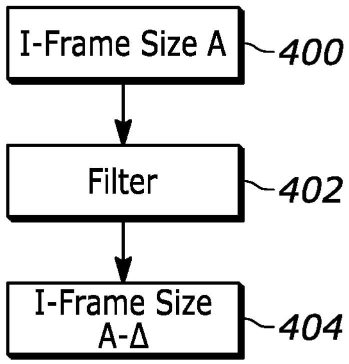
FIG. 4 illustrates an example filtering technique for reducing keyframe size in example flow chart format.
Figure 5:
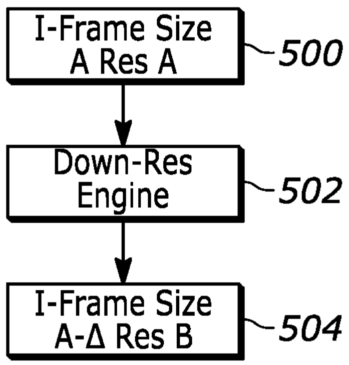
FIG. 5 illustrates an example down-resolution technique for reducing keyframe size in example flow chart format.
Figure 6:
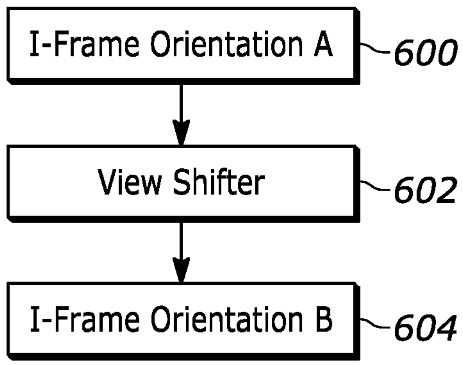
FIG. 6 illustrates an example orientation rotation technique for reducing keyframe size in example flow chart format.

FIGS. 4-6 illustrate respective example filtering techniques for reducing keyframe size. Note that in each of these techniques, the reduced frame can be transmitted to a receiver along with signal indicating the type of reduction that had been performed and/or the type of reconstruction needed at the receiver side so that the receiver is alerted by the signaling of the reconstruction that must be done on the frame. Note further that the techniques herein may be used alone or in combination with other techniques described herein.

In FIG. 4, a keyframe such as an I-frame of a first size ("A") is received at state 400 and processed through a filter at state 402 to render a reduced I-frame of size A-A at state 404. Note that, because the output of low pass filter is a picture of the same resolution, "size" here means picture complexity, not pixel count.

The filter may be implemented by a low-pass filter (LPF) such as a Gaussian filter, or it may be implemented as a circular filter, a bandpass filter, or other filter such as an averaging filter that reduces a small portion of the data, such as a block, to an average of the values of the elements of that block. This reduces the sharpness of the image while reducing the size of the image. Note that if a Gaussian filter is used, the radius can be used. Note further that the strength of the filtering may vary I-frame to I-frame or indeed from slice to slice within the same I-frame, i.e., same filter but different strengths as between I-frames or between slices in the same I-frame. The resolution of the reduced I-frame, however, remains the same as the resolution as the input I-frame.

FIG. 5 on the other hand indicates an I-frame of a first size ("A") is received at state 500 and is its resolution is reduced at state 502 to render a reduced I-frame of size A-A at state 504. For example, a high definition (HD) keyframe may be down-scaled to standard definition (SD).

Figure 7:
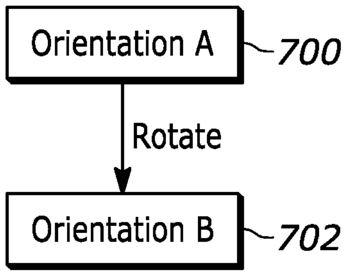
FIG. 7 illustrates rotating a keyframe consistent with FIG. 6.

Yet again, FIG. 6 indicates that an I-frame of a first orientation is received at state 600 and processed by a view shifter at state 602 to change the orientation of the I-frame by, e.g., rotating the I-frame 90° to output an I-frame at state 604 with a different orientation that renders a smaller data footprint. For example, the I-frame can be rotated from a landscape orientation (700 in FIG. 7) to a portrait orientation (702 in FIG. 7). The frame may be transmitted with a flag or other signal indicating the orientation it has and the original orientation it is to be returned to at the receiver.

Figure 8:
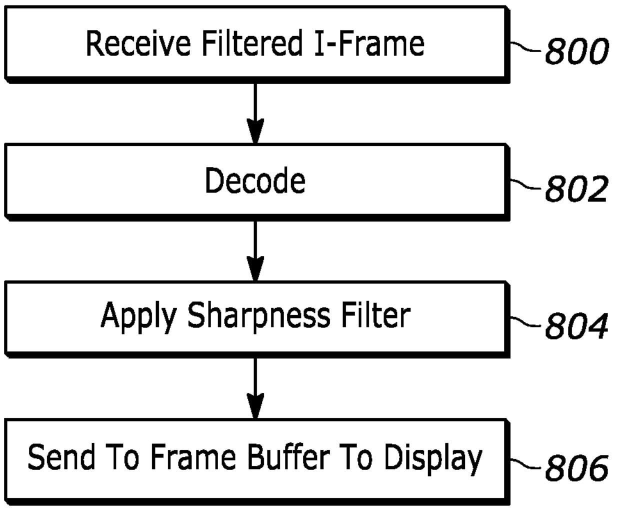
FIG. 8 illustrates a decoder side technique to process video on which the technique of FIG. 4 is implemented, in example flow chart format.

FIG. 8 illustrates a decoder side technique to process video on which the technique of FIG. 4 is implemented. Commencing at state 800, the reduce-sized (filtered) keyframe (such as an I-frame) is received over the network from the transmitter along with the signaling regarding filtering. It is decoded at state 802. After decoding, based on the signaling at state 804 a sharpness filter is applied to sharpen the I-frame to recover some of what was lost in reducing its size at the encoder side. The sharpened frame is sent to a frame buffer at state 806 for presentation on a video display.

Figure 9:
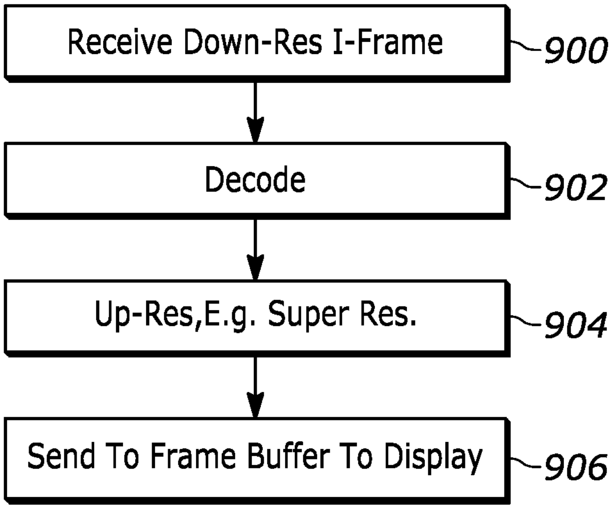
FIG. 9 illustrates a decoder side technique to process video on which the technique of FIG. 5 is implemented, in example flow chart format.

FIG. 9 illustrates a decoder side technique to process video on which the technique of FIG. 5 is implemented. Commencing at state 900, the reduce-sized (down-scaled) keyframe (such as an I-frame) is received over the network from the transmitter. It is decoded at state 902. After decoding, at state 904 the frame is up-scaled, e.g., from SD to HD, using, for example, super resolution techniques. The frame is sent to a frame buffer at state 906 for presentation on a video display.

Figure 10:
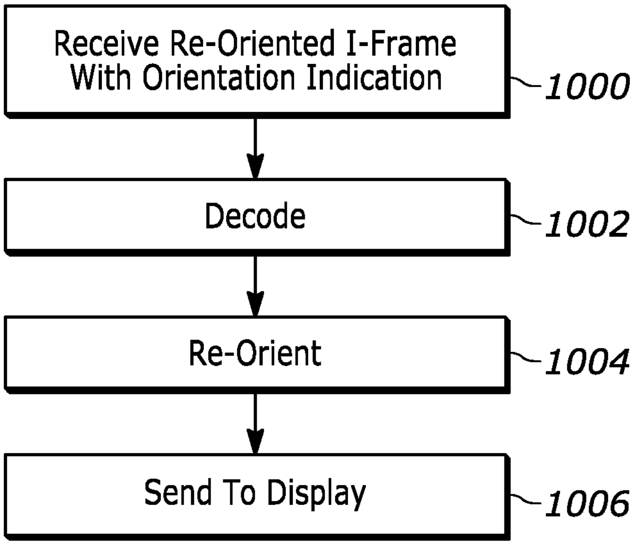
FIG. 10 illustrates a decoder side technique to process video on which the technique of FIG. 6 is implemented, in example flow chart format.

FIG. 10 illustrates a decoder side technique to process video on which the technique of FIG. 6 is implemented. Commencing at state 1000, the re-oriented keyframe (such as an I-frame) is received over the network from the transmitter. It is decoded at state 1002. After decoding, at state 1004, using the signaling from the transmitter the frame is re-oriented to its original orientation. The frame is sent to a frame buffer at state 1006 for presentation on a video display.

Figure 11:
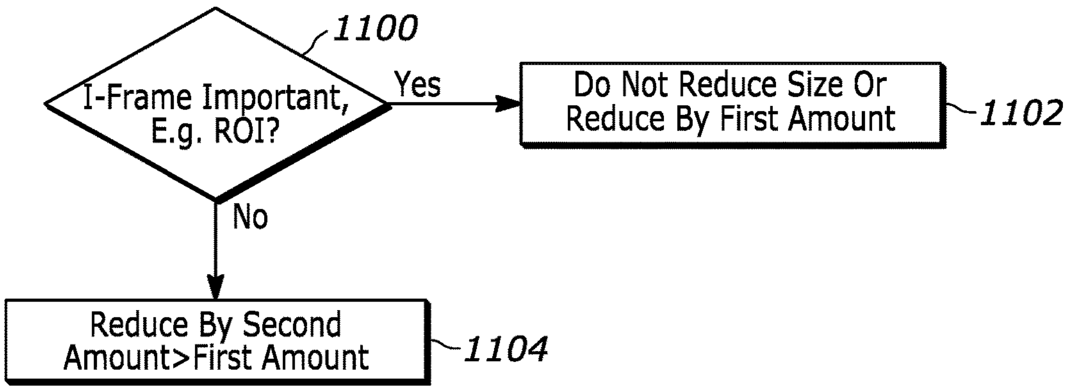
FIG. 11 illustrates reducing keyframe size according to importance of individual frames, in example flow chart format.

FIG. 11 illustrates reducing keyframe size according to importance of individual frames. If it is determined at state 1100 that a keyframe such as an I-frame or portion of a keyframe is important, for example, as being part of a region of interest or part of an important action sequence or other heuristic, its size may not be reduced at state 1102, and the frame/portion of the frame may be encoded and transmitted without reduction or with a first, minor reduction. On the other hand, if it is determined at state 1100 that a keyframe such as an I-frame or portion of a keyframe is not important, for example, as being part of a background or skybox region or other heuristic, its size may be reduced at state 1102, and the frame/portion of the frame may be encoded and transmitted with reduction that is greater than whatever reduction may have been applicable at state 1102.

Figure 12:
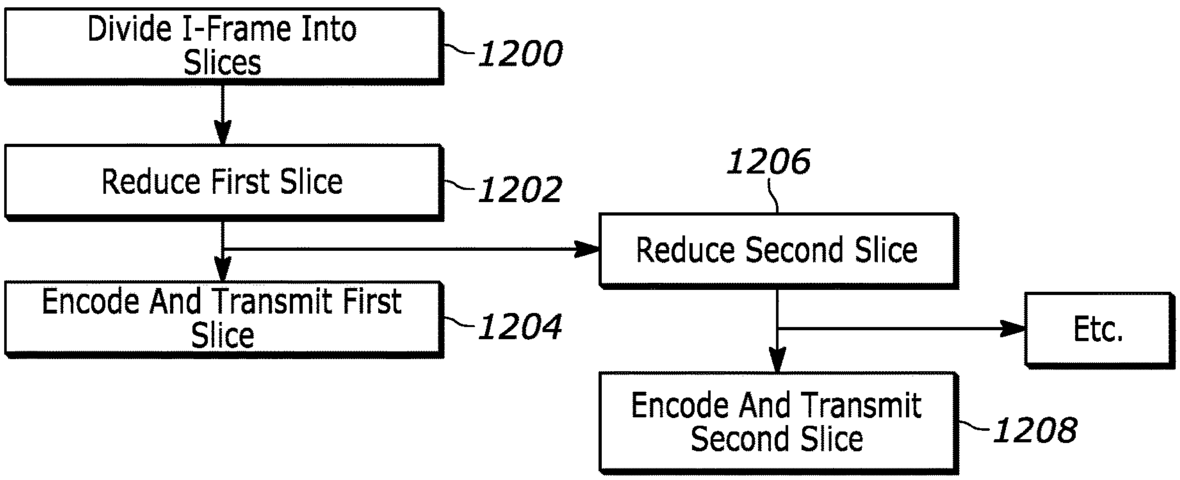
FIG. 12 illustrates a pipeline for reducing a keyframe portion-by-portion and encoding each portion as soon as it is reduced for transmission prior to reducing the entire keyframe, in example flow chart format.

FIG. 12 illustrates a pipeline for reducing a keyframe portion-by-portion and encoding each portion as soon as it is reduced for transmission prior to reducing the entire keyframe to reduce latency. Commencing at state 1200, the keyframe such as an I-frame is divided into slices. The first slice is reduced at state 1202, e.g., by applying a first filter to the first slice at a first strength. The logic then splits, in one branch to encode the reduced first slice and transmit it at state 1204 and in the other branch to reduce, at state 1206, a second slice of the frame. This reduction may be done by applying the same first filter at the same first reduction strength as was applied to the first slice, or by applying the first filter to the second slice at a second strength, or by applying, to the second slice, a second filter of a second type different than the type of the first filter. The second slice is then encoded and transmitted at state 1208 and ensuing slices of the frame reduced and transmitted in like manner in parallel pipeline workflow branches. It is to be understood that the slices are transmitted with appropriate signaling indicating the frame to which they belong and the filter type and strength used to reduce the slice.

Figure 13A:
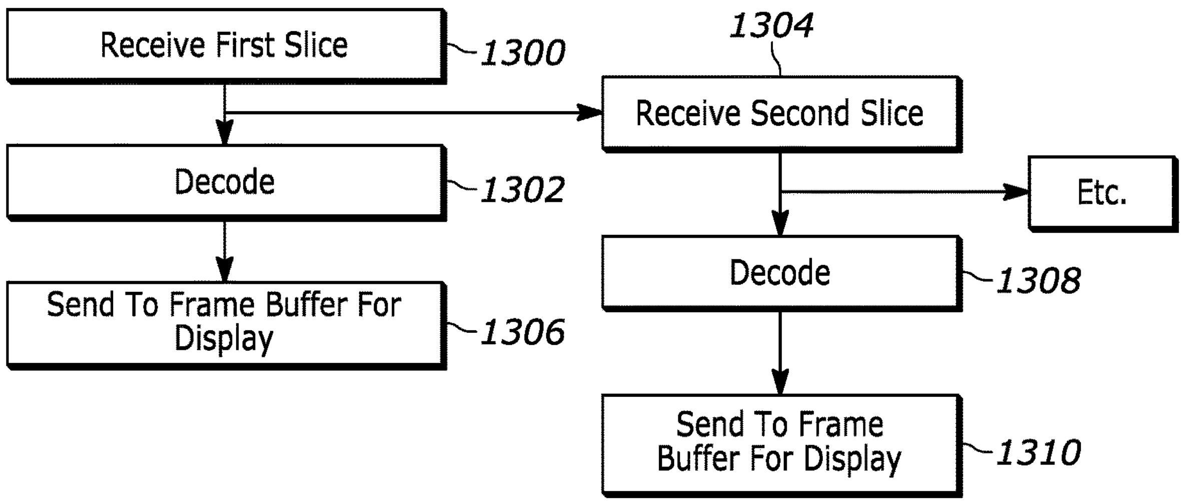
FIG. 13A illustrates a decoder side pipeline for processing video consistent with the technique of FIG. 12, in example flow chart format.

FIG. 13A illustrates a decoder side pipeline for processing video consistent with the technique of FIG. 12. Commencing at state 1300, the first slice of a keyframe is received and decoded at state 1302. In parallel, at state 1304 the second slice of the frame is received. Once the first slice is decoded it can be sent to a frame buffer for display at state 1306 or otherwise presented on a video display as the second slice is being decoded at state 1308. Then once the second slice is decoded it likewise may be sent to a frame buffer for display at state 1310 or otherwise presented on a video display as subsequent slices of the frame are being received and decoded.

Figure 13B:
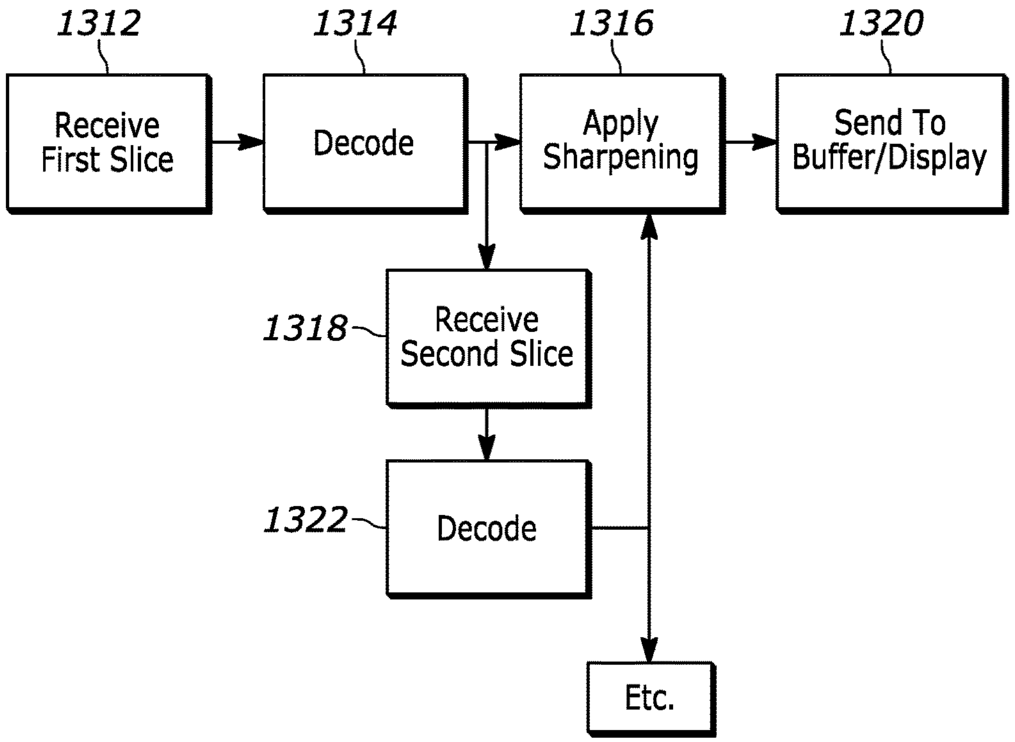
FIG. 13B illustrates an alternate decoder side pipeline for processing video consistent with the technique of FIG. 12, in example flow chart format.

FIG. 13B illustrates an alternate decoder side pipeline for processing video consistent with the technique of FIG. 12. Commencing at state 1312, the first slice of a keyframe is received and decoded at state 1314. A sharpening filter is applied to the first slice at state 1316. In parallel, at state 1318 the second slice of the frame is received. Once the first slice is decoded and sharpened it can be sent to a frame buffer for display at state 1320 or otherwise presented on a video display as the second slice is being decoded at state 1322 and sharpened at state 1316. Then once the second slice is decoded and sharpened it likewise may be sent to a frame buffer for display at state 1320 or otherwise presented on a video display as subsequent slices of the frame are being received and decoded and sharpened.

Figure 14:
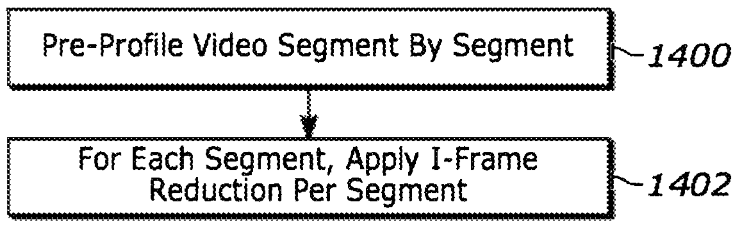
FIG. 14 illustrates a technique for reducing video segments based on pre-profiling the video file, in example flow chart format.

FIG. 14 illustrates a technique for reducing video segments based on pre-profiling the video file. Commencing at state 1400, a video may be pre-profiled segment by segment. For example, a game engine may be programmed by a game developer to indicate for each segment an appropriate amount of keyframe reduction to be implemented on that segment at state 1402, with different levels of reduction being applied to different segments as desired. Or, a video that is a movie can be similarly pre-profiled by a human expert or a machine learning (ML) model trained on a series of movie segments with ground truth reduction indicated for each.

Figure 15:
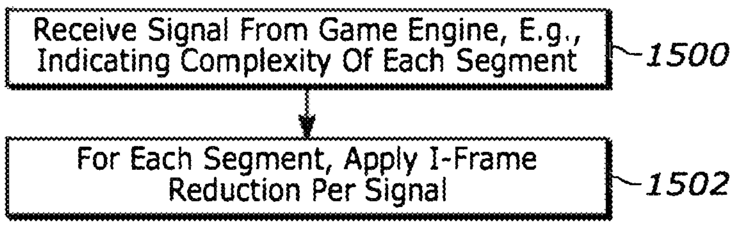
FIG. 15 illustrates a technique for reducing video segments based on signaling from a computer game engine, in example flow chart format.

For example, in FIG. 15 a technique for reducing video segments based on signaling from a computer game engine is shown in which, at state 1500, a signal is received from a game engine that an upcoming scene contains intense or complex video sequencing. In response, at state 1502 keyframe reduction is applied to each segment according to its intensity or complexity, with greater reduction applied to more complex segments and less reduction applied to less complex segments. Or in other embodiments, greater reduction may be applied to less complex segments and less reduction may be applied to more complex segments.

Figure 16:
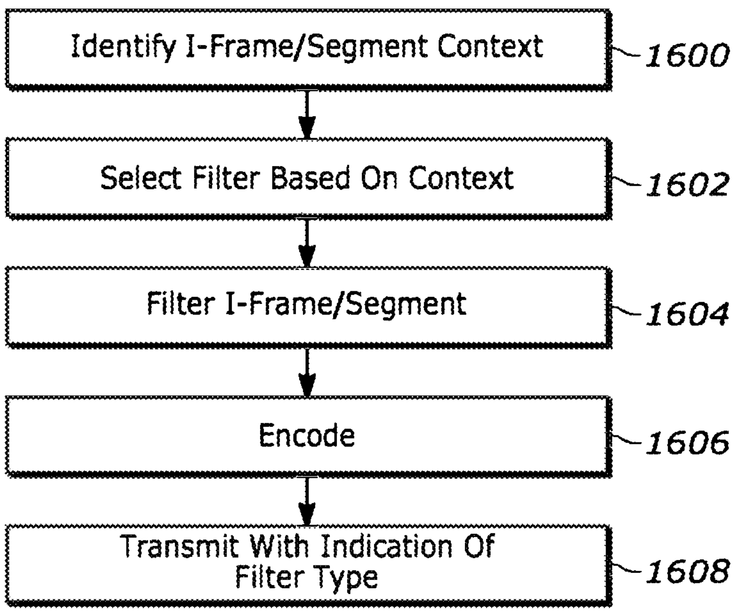
FIG. 16 illustrates selecting a filter for each segment of video based on the content of that segment, in example flow chart format.

FIG. 16 illustrates another example in which a filter is selected for each segment of video based on the content of that segment. At state 1600 the content of a keyframe of the segment is identified, either by signaling that accompanies the keyframe, or by, for example, a ML model trained on a training set of keyframes with ground truth content classifications appended to each. At state 1602 a type of filter and, if desired, filter strength is selected based on the content of the keyframe and/or its associated video segment.

Moving to state 1604, the keyframe or keyframes of the segment are filtered according to the selection(s) at state 1602, and then the reduced frame(s) are encoded at state 1606 and transmitted with signaling indicating the filter type and strength, and/or stored, at state 1608.

Figures 17, 18:
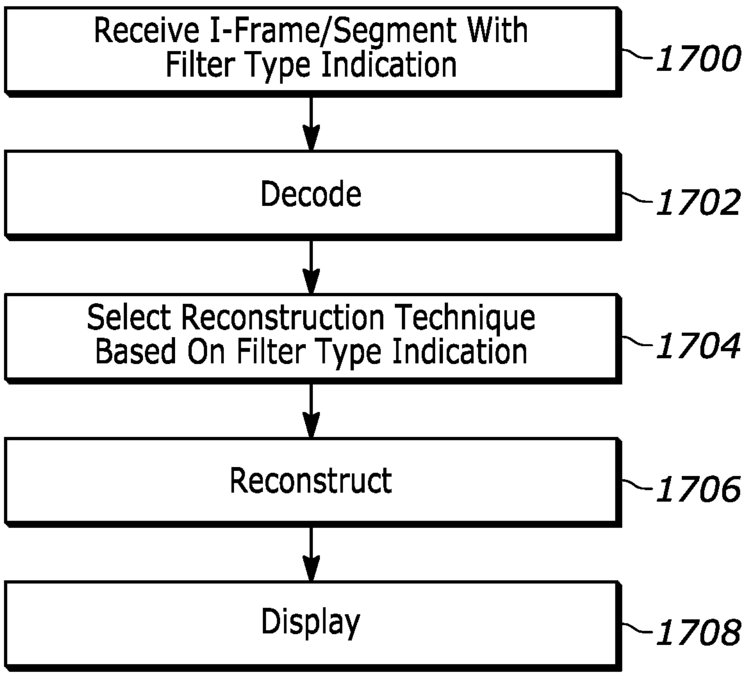
FIG. 17 illustrates a decoder side technique for processing video consistent with the technique of FIG. 16, in example flow chart format.
FIG. 18 illustrates a table consistent with FIG. 17.

FIG. 17 illustrates a decoder side technique for processing video consistent with the technique of FIG. 16. At state 1700 a keyframe of a segment is received from the transmitter over the network. Moving to state 1702 the frame is decoded. Proceeding to state 1704, based on the signaling accompanying the frame, an appropriate sharpening filter and filter strength is selected to reconstruct the frame as much as possible at state 1706 for presentation on a video display at state 1708.

FIG. 18 illustrates a table consistent with FIG. 17. In which a first column 1800 represents signaling data that indicates the type of filter used for a particular segment of the video. A second column 1802 represents the reconstruction filter that applies to the corresponding filter in the same row of the first column. Thus, the first column indicates plural respective filter types used to reduce respective segments of the video while the second column represents the corresponding types of reconstruction filters. Note that the signaling from the transmitter may indicate the reduction filter type (and strength) and leave it up to the receiver to look up the appropriate reconstruction filter, or the signaling from the transmitter may indicate to the receiver what reconstruction filter (and strength) should be used.

Figure 19:
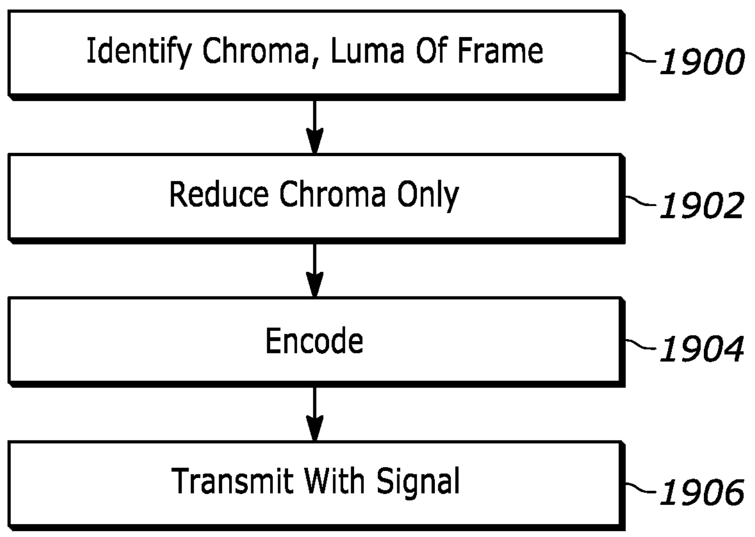
FIG. 19 illustrates a reduction technique in which only chroma information is reduced, in example flow chart format.

FIG. 19 illustrates a reduction technique in which only chroma information is reduced. Commencing at state 1900, the chroma data is identified in a keyframe, as being distinct from luma (luminance) data. The chroma only is reduced at state 1902, encoded with the luma at state 1904, and transmitting at state 1906 with appropriate signaling indicating that the chroma only has been reduced and requires reconstruction.

Figure 20:
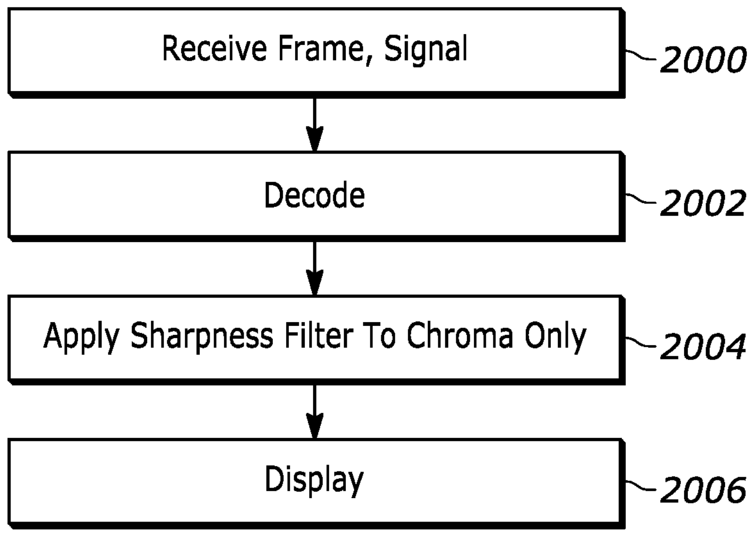
FIG. 20 illustrates a decoder side technique for processing video consistent with the technique of FIG. 19, in example flow chart format.

FIG. 20 illustrates a decoder side technique for processing video consistent with the technique of FIG. 19. The keyframe data is received at state 2000 from the transmitter over the computer network. The frame is decoded at state 2002. Then, based on the signaling from the transmitter, a sharpness filter is applied to only the chroma of the frame at state 2004 and the frame is presented on a video display at state 2006.

It may now be appreciated that among other things, part of a video can be made higher priority and encoded/decoded first as per the above. Post-decoding, prior to sending to the display, coding noise is removed and resolution may be enhanced in some embodiments along with frame rate being sped up if desired. Missing frames can be reconstructed using interpolation between frames before and after the missing frames. The artifacts to be removed are caused by increased quantization of transform coefficients during encoding. The decoder addresses this by working on the decoded coefficient and can post-process only pixels of part of the frame.

While particular techniques are herein shown and described in detail, it is to be understood that the subject matter which is encompassed by the present application is limited only by the claims.

What is claimed is:

1. An apparatus comprising:

a processor; and a non-transitory computer-readable medium communicatively coupled with the processor and having stored thereon computer-executable instructions that, when executed with the processor, cause the apparatus to:

identify at least one condition of at least one network;

determine whether an intraframe (I-frame) of a video is associated with a region of interest of the video;

responsive to the condition and the determination of whether the I-frame of the video is associated with the region of interest of the video, reduce a size of the I-frame of the video; and send the I-frame and at least one non-I-frame to a transmitter for transmission over the network.

2. The apparatus of claim 1, wherein the video comprises computer game video.

3. The apparatus of claim 1, wherein the condition comprises latency.

4. The apparatus of claim 1, wherein the condition comprises bandwidth.

5. The apparatus of claim 1, wherein the instructions further cause the apparatus to reduce the size of the I-frame at least in part by processing the I-frame through a filter.

6. The apparatus of claim 1, wherein the instructions further cause the apparatus to reduce the size of the I-frame at least in part by reducing a resolution of the I-frame.

7. The apparatus of claim 1, wherein the instructions further cause the apparatus to reduce the size of the I-frame at least in part by changing an orientation of the I-frame.

8. The apparatus of claim 7, wherein the instructions further cause the apparatus to signal the orientation of the I-frame.

9. The apparatus of claim 1, wherein the I-frame is a first I-frame and the instructions further cause the apparatus to reduce the size of the first I-frame responsive to the condition and responsive to the first I-frame being of first importance, and not reduce a size of a second I-frame responsive to the condition and responsive to the second I-frame being of second importance.

10. An apparatus comprising:

a non-transitory computer-readable medium having stored thereon a computer program for performing a method, comprising:

reducing a first portion of video prior to encoding using at least a first filtering parameter, the reducing based on an intraframe (I-frame) of the video being associated with a region of interest of the video;

reducing a second portion of the video prior to encoding using at least a second filtering parameter not used to reduce the first portion; and transmitting the portions over a network to at least one receiver.

11. The apparatus of claim 10, wherein the method further comprises:

transmitting the portions over the network along with signaling indicating the first and second filtering parameters.

12. The apparatus of claim 10, wherein the first and second portions are keyframes of the video.

13. The apparatus of claim 10, wherein the first and second portions are portions of one keyframe of the video.

14. The apparatus of claim 10, wherein the first and second filtering parameters comprise respective first and second filtering types.

15. The apparatus of claim 10, wherein the first and second filtering parameters comprise respective first and second filtering strengths.

16. The apparatus of claim 10, wherein the video comprises at least one computer game.

17. A method, comprising:

receiving, over a network, at least a portion of at least a first keyframe of at least one video;

receiving, over the network, signaling indicating reconstruction to apply to the portion of the keyframe, the signaling based on an intraframe (I-frame) of the video being associated with a region of interest of the video; and reconstructing the portion of the keyframe based on the signaling prior to presenting the portion of the keyframe on a video display.

18. The method of claim 17, wherein the reconstructing comprises up-scaling the portion of the keyframe.

19. The method of claim 17, wherein the reconstructing comprises processing the portion of the keyframe using at least one sharpening filter.

20. The method of claim 17, wherein the reconstructing comprises reorienting the portion of the keyframe.

* * * * *